United States Patent [19]
Sobiepanek et al.

[11] 3,898,487
[45] Aug. 5, 1975

[54] LINEAR MOTOR

[75] Inventors: Janusz Sobiepanek, Gif sur Yvette; Jean-Claude Unterseeh, Paris, both of France

[73] Assignee: Societe Generale de Constructions Electriques et Mecaniques ALSTHOM, France

[22] Filed: Nov. 13, 1973

[21] Appl. No.: 415,351

[30] Foreign Application Priority Data
Nov. 13, 1972 France .................... 72.402207

[52] U.S. Cl. .............. 310/80; 310/12; 104/167
[51] Int. Cl. ............................................ H02k 7/06
[58] Field of Search ...................... 310/12–14, 310/30, 80, 103; 318/115, 135; 104/167, 166, 148, 148 LM

[56] References Cited
UNITED STATES PATENTS

| | | | |
|---|---|---|---|
| 1,043,573 | 11/1912 | Keller et al. .................... | 310/103 X |
| 1,985,254 | 12/1934 | Huse ................................ | 310/13 |
| 2,745,027 | 5/1956 | Williford, Jr. ................... | 310/103 |
| 2,848,632 | 8/1958 | Keene ............................. | 310/80 X |
| 3,441,819 | 4/1969 | Palmero ......................... | 318/115 |
| 3,706,922 | 12/1972 | Inagalti ........................... | 318/135 |
| 3,777,587 | 12/1973 | Hoshina et al. ................ | 310/80 X |
| 3,824,420 | 7/1974 | Marihus et al. ................ | 310/80 X |

FOREIGN PATENTS OR APPLICATIONS
945,225  12/1963  United Kingdom ................... 310/80

OTHER PUBLICATIONS
Garrard et al., "Rectilinear screw–thread reluctance motor," Proc. IEE, Vol. 118, No. 11, Nov. 1971 pp. 1575–1584.

*Primary Examiner*—Donovan F. Duggan
*Attorney, Agent, or Firm*—Craig & Antonelli

[57] ABSTRACT

A linear motor includes a fixed portion forming a stator, consisting at least in part of a ferromagnetic material, and at least one mobile inductor portion forming a rotor, and characterized in that the driving force producing the displacement of the rotor along the stator along with the elements integral therewith is due to the interaction of a magnetic field, which is rotated mechanically or is generated by means of a polyphase winding on the rotor, with an even number of ferromagnetic portions forming part of the stator, and whose form is that of a helix developed along and around the axis of the stator.

16 Claims, 8 Drawing Figures

LINEAR MOTOR

The present invention relates to linear-motion electrical machines and more particularly to a linear motor for use in ground transportion systems.

The principle of operation of the linear motor is very simple and is based on the fact that the lines of force of a magnetic field tend to pass along a path of minimum magnetic resistance. The carrying out of this principle of operation is equally very simple and has been discussed to a considerable extent in the literature in recent years.

The motor according to the present invention is composed of a fixed part called a stator, and of a mobile part having the general function of an inductor. The fixed part, or stator, may be secured, for example, to the earth, and the mobile part may be made integral with a vehicle or other structure which is to be displaced along the fixed part, or stator.

A motor such as proposed by the present invention may obviously be utilized for the displacement of any object and is not limited to use as a traction motor for vehicles, and the displacement may be either rectilinear or correspond to a curve having a radii of curvature compatible with the shape and dimensions of the object to be displaced.

The linear motor according to the present invention comprises a fixed part, called a stator, consisting of at least one part made from ferromagnetic material, and at least one mobile part, called an inductor, and is characterized in that the driving force bringing about the displacement of the inductor and the parts integral therewith along the stator is due to the interaction of a rotating magnetic field produced by the inductor with an even number of ferromagnetic parts forming part of the stator, and whose form is that of a helix having the same axis as the stator.

The inductor either may comprise a winding supplied with direct current, or it may consist of permanent magnets, and in that case it is coupled to an auxiliary motor for driving it in rotation. The inductor may also comprise polyphase windings supplied with an alternating current.

According to a particular characteristic of the present invention the inductor is annular, has a polyphase winding, and is disposed outside of the stator around the latter.

In the case of a vehicle which is to be driven over a relatively long distance, it is necessary to support and to secure the stator at several points, which makes it necessary that the stator include an opening parallel to its axis, and the stator then has a cross-sectional shape in the form of a split ring.

According to a preferred embodiment of the present invention, the inductor, or a plurality of inductors, are positioned inside the stator, which has generally the form or shape of a tube which is interrupted longitudinally along a line parallel to its axis so as to allow for a mechanical connection between the inductor and/or inductors placed inside and the object to be moved located outside of the stator.

The helically-shaped portions of the stator may be, for example, the only parts made from ferromagnetic material while the remainder of the stator may be made of another material, for example, concrete, which assures the rigidity of the unit and also provides a sturdy guide, which may serve as a rolling path, by way of rails, for the object to be moved. The stator may also consist solely of these helically-shaped portions which are directly linked mechanically to a support.

In case the entire stator consists of ferromagnetic material, these helices are then formed in relief on the internal face of the interior of the tube forming the stator.

A particularly advantageous embodiment of the present invention, notably in the case where solely the helically-shaped portions of the stator consist of a ferromagnetic material, consists in providing for two inductors shifted or offset by one-half pitch of the helix and arranged in such a manner that their respective magnetic fields are oriented in the same direction. It is in this case advantageous to dispose, in parallel with the axis of the stator and at the level of the interruption of the helices of the stator, a ferromagnetic piece which is connected by means of a magnetic support to a nonmagnetic linkage axis of the two inductors.

Other advantages and characteristics of the present invention will become apparent from the following description when taken with reference to the accompanying drawings, wherein.

Figure 1:
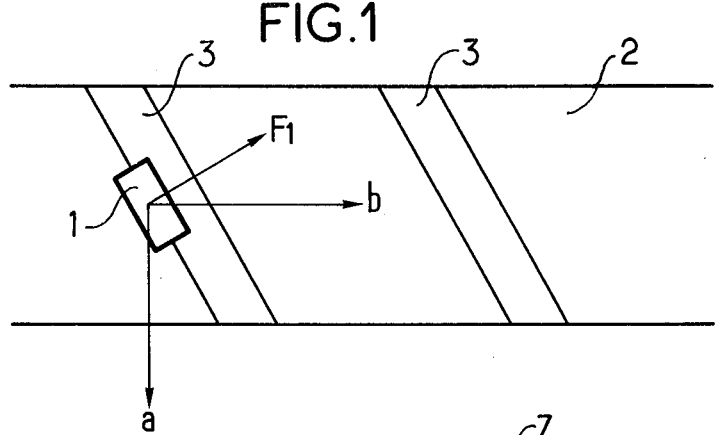
FIG. 1 is a diagram illustrating a principle according to the present invention.

The principle of the present invention is illustrated in FIG. 1, which includes, for example, a magnet 1 and a support assembly 2 onto which there are mounted two elements 3 made from ferromagnetic material, and this assembly may, for example, represent schematically a plane development of a stator according to the present invention.

If the magnet 1 is displaced in the direction $a$, as seen in FIG. 1, there will be created a force of attraction $F_1$ perpendicular to the ferromagnetic element 3, tending to reduce the reluctance of the magnetic circuit. Then one will have a component of displacement in the direction of the arrow $b$.

Figure 2:
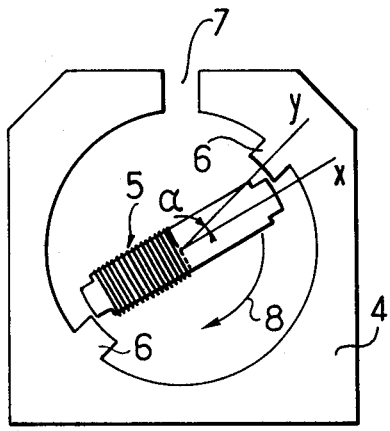
FIG. 2 is a cross-sectional view, taken along a plane perpendicular to the axis of the stator, of a stator of a bipolar motor according to the present invention, with its inductor located at the inside thereof.
Figure 3:
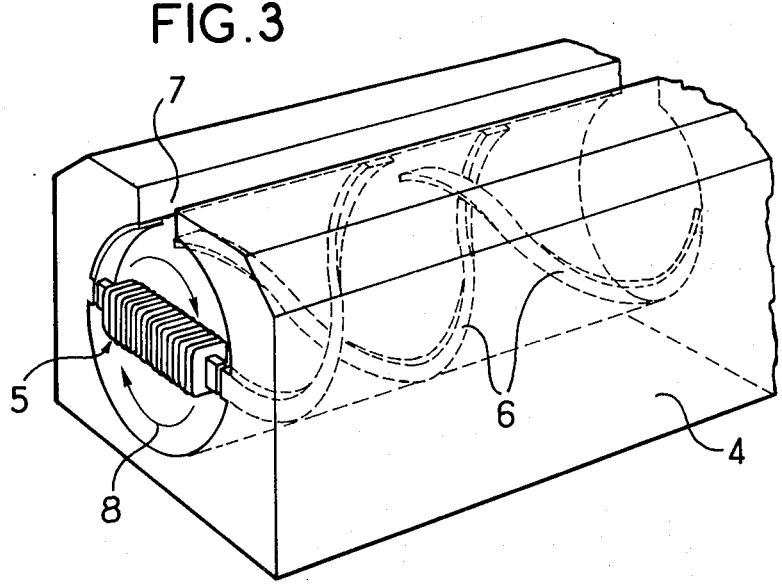
FIG. 3 is a perspective view of a bipolar motor according to FIG. 2.

FIG. 2 shows a section of a stator 4 of a motor as proposed by the present invention, at the inside of which there is found a rotatable bipolar inductor 5, constituted by either a permanent magnet or an inductor coil. The stator 4 comprises on the inner face thereof two protuberances 6 developed in helical form along and around the axis of the stator, as seen in FIG. 3. The two helical protuberances 6 turn in the same direction and are dephased by $\pi$ radians in such a manner that each section of the stator perpendicular to its axis includes the two diametrically opposed protuberances, as is apparent from FIG. 2. These helical protuberances 6 may be an integral part of the mass of the stator 4 itself, or they may be secured on the internal surface of the stator. When these elements are supported on the stator, they are obviously made from ferromagnetic material, which is not necessarily the case for the rest of the stator, especially if the magnetomotive force of the inductor is sufficiently great.

The stator 4 also has a longitudinal opening 7 permitting passage therethrough of a mechanical connection between the inductor 5 and the object to be driven (not shown) which may be any vehicle or object whatsoever.

FIG. 3, which is a perspective view of a motor such as the one represented in FIG. 2, illustrates the stator 4 as comprising on the inner surface thereof the two protuberances 6 in helical form which are interrupted at each turn by the opening 7. Also seen in this figure is the inductor 5 which is provided, for example, as an inductor coil supplied with direct current. If the inductor 5 is driven in rotation by means of an auxiliary motor, for example, in the direction of the arrow 8 shown in FIG. 2, a reaction force F will be generated as a function of the angle $\alpha$. The force F will be zero if $\alpha$ is zero, and which will be maximum when perpendicular to the protuberance 6. There will thus be produced an axial component of force, and the inductor will advance along the length of the stator. This is the principle which is explained in FIG. 1.

In order that there will be generated an axial force, it is thus seen that the axis of the inductor identified with reference symbol $x$ is never confused with the axis of the protuberances 6 identified with reference symbol $y$, but is always a little ahead by the amount of the angle $\alpha$, as is also the case in a conventional synchronous motor where there exists at all times a certain angle between the vector representative of the rotating field and the axis of the pole.

Figure 4:
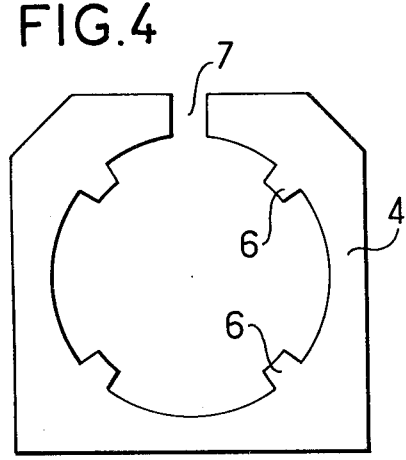
FIGS. 4 and 5 are cross-sectional views of stators of motors with four poles, constructed according to the present invention.

FIG. 4 represents a section of a stator of a motor as proposed by the present invention, but provides an inductor with four poles, and therefore comprises four protuberances 6 developed in helical form along and around the axis of the stator, turning in the same direction and dephased by $\pi/2$ with respect to each other.

Figure 5:
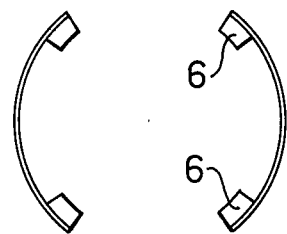

FIG. 5 represents a section of a stator of a motor as proposed by the present invention for an inductor with four poles, but in this case, the stator circuit has an "open" construction so that the size thereof is reduced to a strict minimum. Such a stator may be used for special cases when the magnetomotive force is sufficiently great. There results in this case a notable simplification in the construction of the stator.

In all of these stators, the section of the protuberances being developed in helical form along the axis of the stator is a function of the construction of the inductor and is realized in such a fashion that the ratio of the value of the reluctance of the magnetic circuit offered to the induction flux of the inductor when this flux passes through these protuberances at the value of the reluctance of the magnetic circuit when this flux does not pass through these protuberances will be the weakest possible in such a manner that, if the vector representative of the magnetic field of the inductor turns, the inductor will be subjected to the maximum force tending to cause it to be displaced along the axis of the stator so that the induction flux reaches a minimum of reluctance.

It is understood that the aforementioned protuberances 6, or quite simply the helices 6, are in relief if the stator is made entirely from a ferromagnetic material, but these helices are not necessarily in relief if the rest of the stator consists of a nonmagnetic material. It is even preferable in that case that these helices not be in relief, and this is the case notably in FIG. 8 which will be further described hereinbelow.

The magnetic field of the inductor may rotate mechanically, as in the case of the inductor consisting of a permanent magnet or of a coiled inductor through which flows a direct current and which is driven in rotation with the aid of an auxiliary machine, as shown in FIGS. 2 and 3. But the inductor may also comprise a polyphase winding producing a rotating field, and this solution is very advantageous because it is not necessary then to provide an auxiliary machine to drive the inductor in rotation. The inductor is then, for example, wound in a three-phase manner, and nothing is changed with respect to the stator.

In the direct current version, as in the case of the three-phase alternating current version, the stator has as many protuberances developed in helical form along the stator as the inductor has poles. Thus, in the case of FIGS. 4 and 5, the inductor may be either an inductor with permanent magnets having four poles, or an inductor having four wound poles and supplied with direct current. It may even consist of a polyphase inductor, for example, a three-phase inductor, having four poles.

One advantage of the motor comprising a winding supplied with direct current consists in the possibility of making it as a superconductor, which makes it possible to obtain a great air gap and to obtain a very much lighter stator in an open circuit, such as that shown in FIG. 5.

An alternating current motor according to the present invention can be realized with no difficulties, since it is very well known in the art to manufacture polyphase inductors with two, four, six, etc., poles and, as has been stated above, it is obviously possible to have several inductors following each other and connected either in series or in parallel, depending upon the needs and conditions of operation. A significant advantage of the alternating current motor consists in that there is no turning mechanical part or element, and thus the connection between the inductor and the object to be moved can be obtained in a very simple manner.

Figure 6:
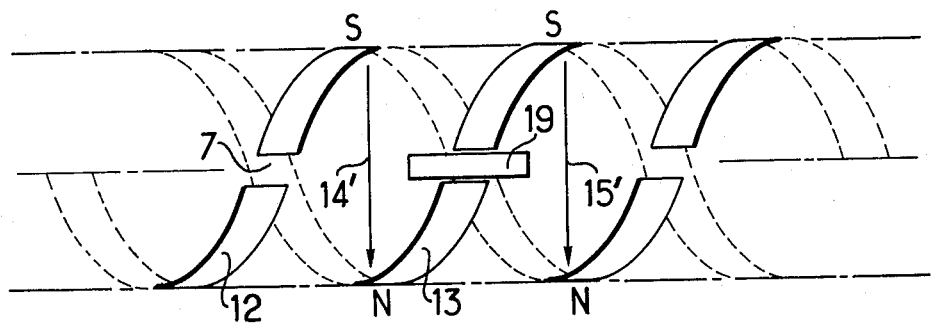
FIG. 6 is a schematic diagram illustrating a further principle according to the present invention.
Figure 7:
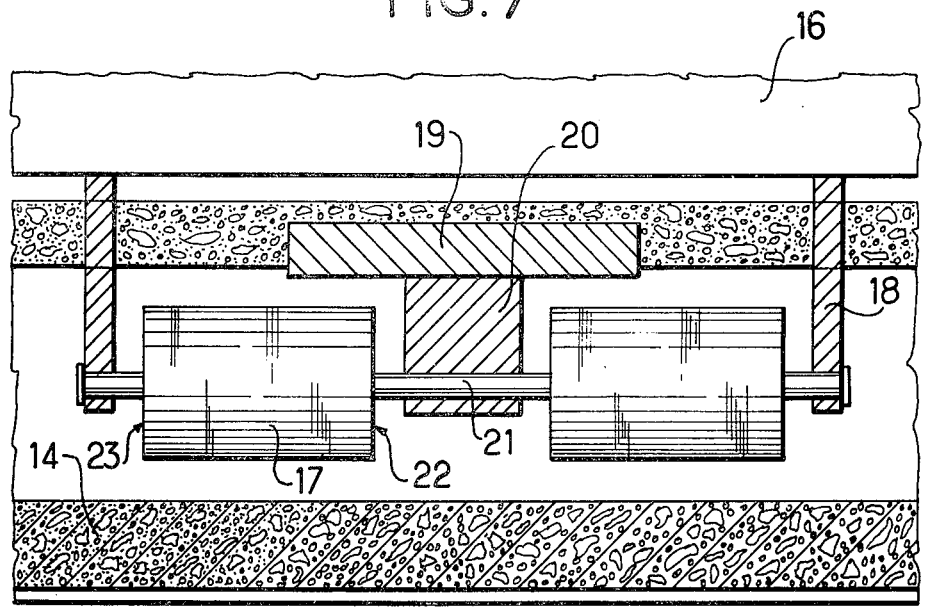
FIGS. 7 and 8 are longitudinal and axial sectional views, respectively, of an embodiment of a motor according to the present invention comprising two bipolar inductors shifted with respect to each other by one-half helical pitch.
Figure 8:
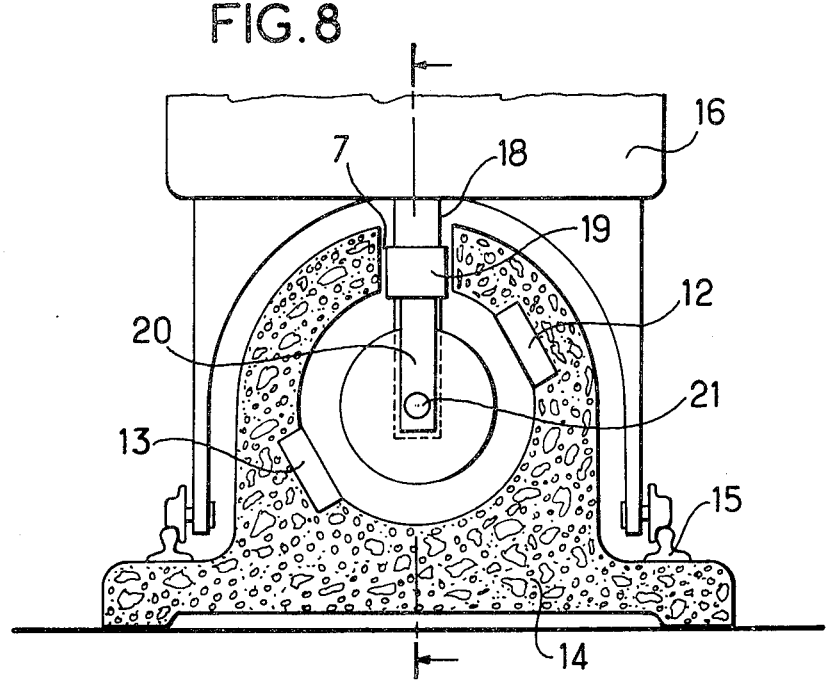

FIGS. 6, 7, and 8 show a very advantageous example of the present invention. FIG. 6 is a schematic representation of a bipolar motor supplied with either direct current or alternating current, thus comprising two helices 12 and 13 and carrying two inductors, whose magnetic fields are represented by the arrows 14' and 15', shifted by half a helix pitch, and whose branching is such, for a motor with inductors carrying for example, a three-phase winding supplied with alternating current, that the direction of the field provided respectively in each inductor is as represented by the arrows, which is to say that the field turns in the same direction and remains parallel and in the same direction at any moment, or whose direction for inductors with direct current is such that the fields be also parallel and have the same direction at any instant during the rotation of the inductors. In this case, one may delete the unnecessary portion of the magnetic circuit of the stator, and the field of one inductor is closed by the other by means of the helices, and the stator is composed solely of two ferromagnetic strips 12 and 13 being wound in helical form and comprising the openings 7 which allow for the mechanical connection between the object to be moved and the inductor. It suffices equally to provide for mechanical connections linking these strips to ground, for example, but not having any role in the guiding of the flux. Another advantageous solution consists in embedding the helical ferromagnetic strips 12 and 13 within a block 14 (FIG. 8), for example, consisting of concrete, which assures the rididity of the assembly or unit, and which may carry rails 15 on which rests the object 16 to be moved. The object 16 to be moved is connected with the two inductors 17 (FIG. 7) by non-magnetic linkages 18. A ferromagnetic piece 19 is connected by means of a non-magnetic support 20 to an axle 21 which is also non-magnetic and serves as the connection between the two inductors 17. This piece 19 is located parallel to the axis of the stator and at the level of the opening of the helices 12 and 13 of the stator opening 7 and glides along this opening at the same time during which the object 16 to be moved is displaced. As is apparent from FIG. 6, this piece completes the magnetic circuit consisting of the two inductors and the helices. The length of this piece 19 is advantageously comprised between the length separating the two internal faces 22 of the inductors and the length separating the two external faces 23 of the two inductors.

In all of the preceding embodiments, it is preferable that the width of the opening 7 of the stator be smaller than the width of the poles of the inductor and/or inductors. The poles will be real poles in the case of inductors formed by permanent magnets or comprising a winding supplied with direct current and fictitious poles in the case of an inductor comprising a three-phase winding.

Furthermore, the ferromagnetic portions in helical form may be either solid or laminated in the direction of the length thereof.

A motor has been described in FIGS. 6, 7, and 8 comprising two inductors of which one ensures that the fields are at each instant parallel and in the same direction; however, it is quite evident that one may associate several identical motors along the stator which are distributed in such a manner that, if there is, for example, $n$ motors, the magnetic field of each driving motor is dephased by $2\pi/n$ with respect to the magnetic field of the preceding motor.

When the inductors comprise polyphase windings, it is of interest to incline the slots in which the windings are disposed at the same pitch as the helices. It is also advantageous to incline the poles for the inductors comprising permanent magnets or those wound and supplied with direct current at this same pitch as the helices.

It is understood that in all of these motors, the number of poles of the inductors depends upon the conditions of operation and are to be chosen in the same manner as for the conventional motors. The same holds true for the choice of the number of inductors and their branchings. Furthermore, the pitch of the helices is to be chosen as a function of the speed, of the power of the motor, etc., and one would not depart from the spirit and scope of the present invention by a simple modification of these conditions.

What is claimed is:

1. A linear motor comprising a stator having a generally tubular shape, an even number of ferromagnetic elements having the shape of a helix disposed coaxially within said stator, and a movable member disposed within said stator and including means for producing a rotating field coaxial with said stator so as to produce a linear movement of said movable member along the axis of said stator as a result of the interaction between said rotating field and said ferromagnetic elements, said stator being longitudinally interrupted along a line parallel to its axis and said movable member being mechanically connected to an object to be moved, placed outside of the stator by a linkage traversing said longitudinal interruption.

2. A linear motor according to claim 1 wherein said stator is made from a material other than ferromagnetic material.

3. A linear motor according to claim 2 wherein said ferromagnetic elements are directly connected mechanically to said stator.

4. A linear motor according to claim 1 wherein said stator is entirely constituted of a ferromagnetic material, and wherein said ferromagnetic elements in helical form are provided as projections disposed on the internal surface of the generally tube-shaped stator.

5. A linear motor according to claim 1 wherein two identical movable members are disposed in said stator and connected to said object, said members being spaced by one-half a pitch of said helical shaped ferromagnetic elements.

6. A linear motor according to claim 5, characterized in that said movable members include bipolar inductive elements disposed in such a manner that their respective fields are in the same direction.

7. A linear motor according to claim 1, characterized in that said movable member includes a polyphase winding supplied with an alternating electric current.

8. A linear motor according to claim 7, characterized in that said polyphase windings are inclined at the same pitch as said ferromagnetic elements.

9. A linear motor according to claim 1, characterized in that said movable member is constituted by a permanent magnet, and in that said permanent magnet is driven in rotation about the axis of said stator by an auxiliary motor.

10. A linear motor according to claim 9, characterized in that the poles of said permanent magnet are inclined at the pitch of said ferromagnetic elements.

11. A linear motor according to claim 5, characterized in that a ferromagnetic piece is disposed parallel to the axis of the stator at the level of the longitudinal opening therein and is connected by means of a non-magnetic support to a non-magnetic connecting element for connecting the two movable members.

12. A linear motor according to claim 1, characterized in that the width of the longitudinal interruption of the stator is smaller than the width of said movable member.

13. A linear motor according to claim 1, characterized in that said ferromagnetic elements are laminated.

14. A linear motor according to claim 1, characterized in that said stator comprises n movable members distributed in such a manner that the magnetic field of each movable member is dephased by $2\pi/n$ with respect to the magnetic field of the preceding movable member.

15. A linear motor according to claim 1, characterized in that said movable member is constituted by a winding connected to a source of direct current, and in that said winding is driven in rotation about the axis of said stator by an auxiliary motor.

16. A linear motor comprising a stator having a generally cylindrical hollow and being interrupted longitudinally along a line parallel to its axis, said stator including an even number of active parts made from ferromagnetic material having the form of helices disposed coaxially within said cylindrical hollow, and inactive parts made from a non-ferromagnetic material forming said cylindrical hollow and providing the support of said active parts therein, and means for guiding and supporting a structural member disposed outside of the stator and mechanically connected to at least one assembly of two inductors disposed within said cylindrical hollow, said inductors comprising polyphase windings, placed concentrically within said cylindrical hollow, the two inductors being connected by a non-magnetic mechanical connection on which there is mounted a support on which is secured a ferromagnetic piece disposed parallel to the axis of the cylindrical hollow and placed at the level of the longitudinal interruption in said stator which serves to periodically open said helices.

* * * * *